(12) United States Patent
Camp

(10) Patent No.: US 7,434,841 B2
(45) Date of Patent: Oct. 14, 2008

(54) STEERING ASSEMBLY

(75) Inventor: Eckart Op Den Camp, Koblenz (DE)

(73) Assignee: Lucas Automotive GmbH (DE)

( * ) Notice: Subject to any disclaimer, the term of this patent is extended or adjusted under 35 U.S.C. 154(b) by 209 days.

(21) Appl. No.: 11/250,629

(22) Filed: Oct. 14, 2005

(65) Prior Publication Data

US 2006/0157949 A1    Jul. 20, 2006

Related U.S. Application Data

(63) Continuation of application No. PCT/EP2004/004113, filed on Apr. 15, 2004.

(30) Foreign Application Priority Data

Apr. 17, 2003    (GB) ................................. 0308911.7

(51) Int. Cl.
*B62D 1/00* (2006.01)
*B62D 1/18* (2006.01)
(52) U.S. Cl. ....................... 280/777; 280/775
(58) Field of Classification Search ................. 280/775, 280/777; 74/493
See application file for complete search history.

(56) References Cited

U.S. PATENT DOCUMENTS

| | | | | |
|---|---|---|---|---|
| 5,477,744 A | 12/1995 | Hoblingre et al. | | |
| 5,626,363 A * | 5/1997 | Rispeter | ...................... | 280/775 |
| 5,899,497 A * | 5/1999 | Spencer et al. | ............... | 280/775 |
| 5,988,679 A | 11/1999 | Schelling et al. | | |
| 6,324,935 B1 | 12/2001 | Schoen et al. | | |
| 6,394,493 B1 | 5/2002 | Kieserling et al. | | |
| 6,663,290 B1 * | 12/2003 | Schepis | ....................... | 384/491 |
| 6,948,741 B2 * | 9/2005 | Manwaring et al. | ......... | 280/775 |
| 7,059,774 B2 * | 6/2006 | von Wenz | .................... | 384/285 |
| 7,147,375 B2 * | 12/2006 | Zernickel et al. | ............... | 384/49 |
| 2003/0172765 A1 * | 9/2003 | Heiml | .......................... | 74/493 |
| 2004/0057786 A1 | 3/2004 | Heiml | | |

FOREIGN PATENT DOCUMENTS

| DE | 199 33 676 C2 | 8/2001 |
|---|---|---|
| EP | 0 836 981 A1 | 4/1998 |
| WO | WO 02/34607 A1 | 5/2002 |

* cited by examiner

*Primary Examiner*—Kevin Hurley
*Assistant Examiner*—Nicole Verley
(74) *Attorney, Agent, or Firm*—MacMillan, Sobanski & Todd, LLC

(57) ABSTRACT

A steering assembly for a vehicle comprising: a fixed guide portion; a movable steering column portion which is arranged to move relative to the fixed portion to permit a collapse of the steering column assembly; and at least one bearing element which is located between the fixed guide portion and the movable steering column portion and provides a bearing surface upon which the movable portion can slide relative to the guide portion in which the bearing element is able to articulate relative to the guide portion. The bearing element may provide longitudinal guidance to the movable portion in the event of a collapse or reach adjustment.

11 Claims, 2 Drawing Sheets

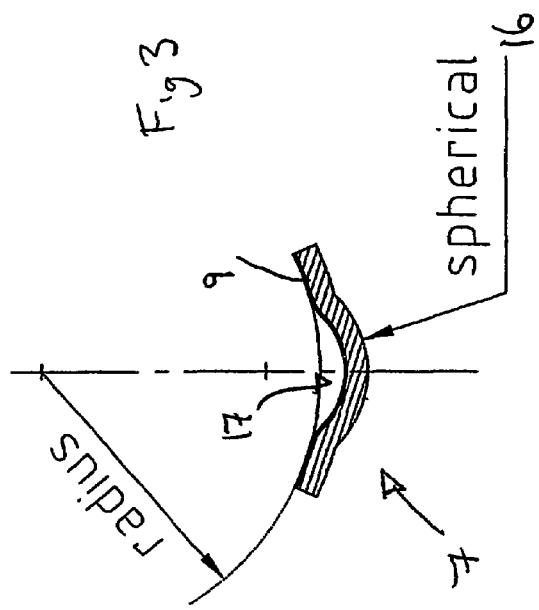
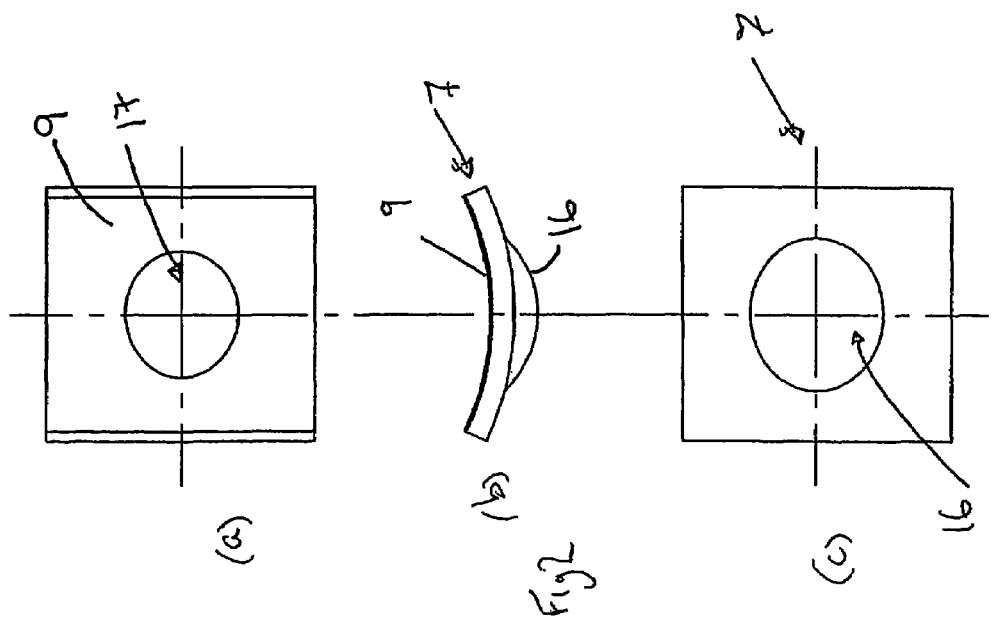

STEERING ASSEMBLY

CROSS-REFERENCE TO RELATED APPLICATIONS

This application is a continuation of International Application No. PCT/EP2004/004113 filed Apr. 15, 2004, the disclosures of which are incorporated herein by reference in entirety, and which claimed priority to Great Britain Patent Application No. 0308911.7 filed Apr. 17, 2003, the disclosures of which are incorporated herein by reference in entirety.

BACKGROUND OF THE INVENTION

This invention relates to an improved steering assembly, especially but not exclusively, for a road vehicle such as a passenger car.

In a steering assembly for a vehicle a steering wheel is connected through a steering shaft to one or more road wheels. Turning the wheel allows the driver to turn the roadwheels which in turn steers the vehicle.

The position of the steering shaft, which is typically supported relative to a fixed part of the vehicle by a steering column shroud, is important as it determines the position of the wheel relative to the driver. To permit the driver to achieve a comfortable driving position the steering column may adjust for rake and or reach of the wheel. A clamp mechanism may be provided which can be released to allow the wheel to be adjusted and locked to fix the wheel in position during normal use. However, in the event of an accident involving a rapid deceleration of the vehicle it is desirable for the steering assembly to collapse longitudinally allowing the steering wheel to move towards the front of the vehicle under the weight of the driver.

The collapse of a steering assembly has in the past been achieved in many ways. In one arrangement the steering shaft is manufactured as a single component with weakenings along its length permitting it to collapse axially by a controlled deformation as a force is applied to the steering wheel. In an alternative, it is known to provide a two-part steering shaft in which one part slides axially over the other as a force is applied to the steering wheel.

BRIEF SUMMARY OF THE INVENTION

In accordance with a first aspect of the invention we provide a steering assembly for a vehicle comprising:

a fixed guide portion and a movable steering column portion which is arranged to move relative to the fixed portion to permit a collapse of the steering column assembly; and at least one bearing element which is located between the fixed guide portion and the movable steering column portion and provides a bearing surface upon which the movable portion can slide relative to the guide portion; and in which the bearing element is able to articulate relative to the guide portion.

The bearing element may provide longitudinal guidance to the movable portion in the event of a collapse or reach adjustment. Allowing the bearing surface to articulate or move enables the bearing surface to closely follow a corresponding surface of the movable portion. This permits tolerances in the assembly to be accommodated and ensures that the bearing surfaces are correctly aligned. This may help to ensure that excessive friction is not present between the surfaces during adjustment of the assembly for reach.

The range of articulation of the element may be limited.

The bearing element may include a protrusion that extends away from the bearing surface and is received within a socket or recess provided in the guide portion. The protrusion may comprise a hemispherical or other ovoid or part spherical protrusion or other convex form.

The recess may also comprise a corresponding concave recess, which may be hemi-spherical or ovoid or conical. Indeed, many different forms of bearing element and recess are envisaged. The recess retains the bearing element whilst permitting it to articulate.

The shape of the protrusion and of the recess may compliment one another such that the bearing can move about two or perhaps three different axes. The bearing element may therefore swivel within the recess with a surface of the protrusion sliding over a surface of the recess. A part spherical protrusion and a recess having substantially the same radii will permit the bearing to swivel within the recess about an imaginary point which forms the centre of revolution of the part spherical protrusion and this is preferred.

Of course the same movement can be achieved if the recess is not part spherical so long as it contacts the protrusion at any two or more points which are spaced around its circumference.

The bearing surface of the bearing element may be flat or it may lie within a single curved plane. In either case, the shape of the bearing surface may be chosen to match the shape of the movable portion at the point where they contact one another. The bearing surface may have substantially the same radius of curvature as the movable portion at the point where it is in contact with the movable portion. The surface therefore contacts the movable portion across its whole surface. The radius of curvature of the bearing surface may be centred on a point, which coincides with the axis of revolution of the protrusion.

The bearing element may have a generally constant thickness (from the bearing surface to its opposite face) throughout, and in order to achieve this may comprise a deformed steel sheet. The sheet may be deformed about a substantially centre point to form the protrusion extending away from the bearing surface. Such a construction is advantageous as it will provide a recess in the bearing surface, which can accommodate a lubricant.

It will, nevertheless, be understood that a recess for lubricant is not limited to bearing elements produced from sheet material, and can be combined with any of the other stated features of the bearing described herein.

The bearing surface may additionally or alternatively be provided with a low friction coating such as Teflon®. This may also be provided on regions of the bearing element that contact the fixed portion inside the recess.

A clamping mechanism may be provided which is operable between a first condition in which the movable portion is free to move relative to the fixed portion to permit driver adjustment of the steering assembly for reach and a second condition in which it is locked to prevent reach adjustment. The bearing element may be free to articulate when the clamping mechanism is in the first condition or operated between the first and second conditions to account for misalignment of the guide portion relative to the movable portion during adjustment. The bearing elements can therefore self-align as the portions move.

The clamping mechanism may comprise a pin having a head and a stem which passes through an opening in the movable portion and the fixed portion, the head being of greater dimension than the opening in the movable portion and located on the opposite side of the movable portion to the guide portion. A clamping device such as a cam and follower connected to a locking handle may be provided for movement of the pin axially to clamp the movable portion between the head and the fixed portion when in the second condition.

At least two bearing elements may be provided, with one being provided on each side of the axis of the pin of the clamping mechanism. Three bearing elements is in fact a preferred number as they can be located in such a manner that the bearing surfaces they present resist rotation of the movable portion.

Where more than two bearing elements are provided a connecting band may be provided which joins them together whilst permitting them to move relative to one another.

The movable portion may have a curved surface at the region where the bearing elements are located, with the bearing elements spaced around the surface of the movable portion. It may comprise a hollow shroud and a steering shaft located at least partially within the shroud. The steering shaft may be operatively connected to a steering wheel of the vehicle. The shroud may comprise an upper part and a lower part, which can slide relative to one another in the event of a collapse of the steering column assembly.

The fixed portion may comprise a U-shaped or C-shaped channel, which accommodates at least partially a section of the movable portion, an internal wall of the channel providing location for the recesses, which accommodate the bearing element(s).

The fixed portion may comprise a cast metal or plastic or composite component. It is preferably cast in aluminium. It may be fixed in position relative to the chassis of a vehicle. Alternatively, the fixed portion may be arranged such that it can move relative to the chassis of a vehicle for rake adjustment of the steering assembly. The same clamp mechanism that may be used to adjust the assembly for reach may be used for rake adjustment.

Other advantages of this invention will become apparent to those skilled in the art from the following detailed description of the preferred embodiments, when read in light of the accompanying drawings.

BRIEF DESCRIPTION OF THE DRAWINGS

FIG. 2(a) is a top view of one of the bearing elements of the steering assembly of FIG. 1, 2(b) is a side view and 2(c) as a view from below of the bearing element; and FIG. 3 is an alternative side view in cross section of the element of FIG. 2.

DETAILED DESCRIPTION OF THE INVENTION

Figure 1:
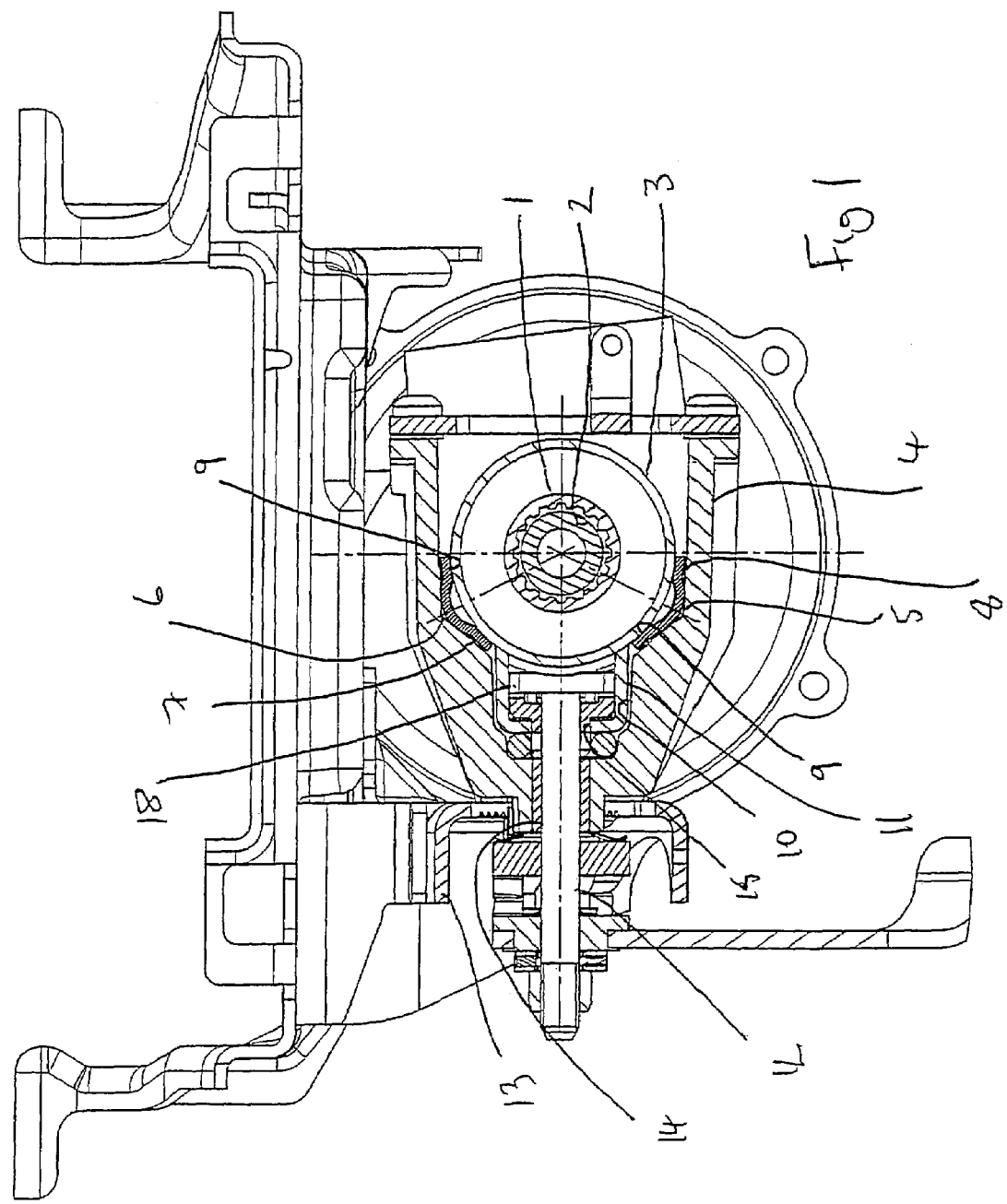
FIG. 1 is a cross sectional view of a steering assembly in accordance with the invention.

The assembly comprises a two-part steering shaft 1, 2, which interconnects a steering wheel (not shown) with an optional electric motor (also not shown). One part of the steering shaft 1 has a splined internal bore, which slidingly accommodates an upper end of the other part 2 of the steering shaft. The splines on the two parts prevent them from rotating relative to one another. Both parts 1, 2 are supported by bearing races (not shown) within a tubular shroud 3. This shroud together with the steering shaft defines a movable portion of the assembly.

The shroud is located with an elongate fixed portion 4 which has a generally C-shaped cross section along most of its length with the inside wall of the fixed portion 4 being provided with two recesses 5, 6 which each locate a respective bearing element 7, 8. One of the bearing elements 7, 8 is shown in more detail in FIGS. 2 and 3 of the accompanying drawings. The bearing element 7 defines a bearing surface 9, which engages a region of the movable portion to provide location and guidance for the movable portion.

The bearing element comprises a sheet metal element which is pressed or otherwise deformed to provide a curved bearing surface 9 which has the same radius of curvature as the shroud at the regions where contact is made. On the opposite side the bearing element 7 includes a part-spherical protrusion 16, which fits snugly within a respective recess 5, 6 in the fixed portion 4. The bearing element 7 is free to swivel in the recess as the protrusion 16 slides across the surface of the recess.

The bearing surface 9 extends beyond the protrusion 16 and this limits the range of articulation of the bearing element 7 within the recess or socket 5, 6. At the centre of the bearing surface a small recess 17 is defined which accommodates a lubricant (not shown) for the bearing surface 9.

A groove 10 is cast in the inside wall of the fixed portion 4 at the base of the c-shaped opening. This groove extends axially along the fixed portion 4 opposite the open side of the c-shaped cross-section, and separates the two recesses 5, 6. A locating rail 11 is laser welded to one side of the shroud 3 and is located within the groove 10 in the fixed portion 4. The location of this rail 11 in the groove 10 ensures that the shroud 3 will resist any torsional forces, which may be applied to the shroud.

To permit the reach of the steering column assembly to be adjusted the fixed portion is secured by a lateral clamp bolt or pin 12 to a pressed steel bracket 13 secured to the vehicle body. The bracket and the fixed portion have an opening 14 through which the shaft of the bolt passes. The pin also passes through a further opening 15 in the rail 10. The guide portion can be moved when the bolt is loosened, allowing the position of the assembly to be adjusted. When the bolt is tightened a head 18 of the pin pulls the rail onto the fixed portion, pressing the shroud into engagement with the bearing surfaces of the bearing elements 7, 8 so the whole assembly is fixed.

In normal use the fixed portion 4 holds the shroud 3 in a fixed axial position. The shroud 3 is fixed in place axially by frictional engagement between the bearing surfaces 9 and the shroud 3 provided by the clamp mechanism. Because the bearing elements 7, 8 can swivel within their respective recesses 5, 6 a good contact between the bearing surfaces 10 and the shroud 3 is assured and all the parts are aligned concentrically with a high degree of accuracy.

In the event of an accident, which causes a driver to apply a high axial load to the steering wheel, the steering shaft 1, 2 and the shroud 3 can slide longitudinally across the bearing surfaces 10.

In accordance with the provisions of the parent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A steering assembly for a vehicle comprising:
a fixed guide portion;
a movable steering column portion which is arranged to move relative to said fixed portion to permit a collapse of said steering column assembly; and
at least one bearing element which is located between said fixed guide portion and said movable steering column portion, said bearing element providing a bearing surface upon which said movable portion can slide relative to said guide portion, said bearing surface including a recess for accommodating a lubricant; and wherein said bearing element is able to articulate through a limited range relative to said guide portion and wherein said bearing surface is curved with substantially the same radius of curvature as the moveable portion at a point where said bearing surface is in contact with the moveable portion.

2. The steering assembly according to claim 1 wherein said bearing element provides longitudinal guidance to said movable portion in an event of a collapse.

3. The steering assembly of claim 1 wherein said bearing surface is provided with a low friction coating.

4. The steering assembly of claim 1 wherein a clamping mechanism is provided which is operable between a first condition in which said moveable portion is free to move relative to said fixed portion to permit driver adjustment of said steering assembly for reach and a second condition in which it is locked to prevent reach adjustment, said bearing element being free to articulate when said clamping mechanism is in said first condition to account for misalignment of said guide portion relative to said moveable portion during adjustment.

5. A steering assembly for a vehicle comprising:
a fixed guide portion;
a movable steering column portion which is arranged to move relative to said fixed portion to permit a collapse of said steering column assembly; and
at least one bearing element which is located between said fixed guide portion and said movable steering column portion, said bearing element providing a bearing surface upon which said movable portion can slide relative to said guide portion, said bearing surface including a recess for accommodating a lubricant; and wherein said bearing element is able to articulate relative to said guide portion, wherein said bearing element includes a protrusion that extends away from said bearing surface and is received within a socket or recess provided in said guide portion.

6. The steering assembly according to claim 5 wherein said protrusion comprises at least one of a hemispherical protrusion, an ovoid protrusion, a part spherical protrusion and another convex form.

7. The steering assembly according to claim 6 wherein said recess comprises a corresponding concave recess.

8. The steering assembly according to claim 5 wherein a shape of said protrusion and of said recess compliment one another such that said bearing element can move about two different axes.

9. The steering assembly of claim 5 wherein said bearing element can swivel within said recess with a surface of said protrusion sliding over a surface of said recess.

10. A steering assembly for a vehicle comprising:
a fixed guide portion;
a movable steering column portion which is arranged to move relative to said fixed portion to permit a collapse of said steering column assembly; and
at least one bearing element which is located between said fixed guide portion and said movable steering column portion, said bearing element providing a bearing surface upon which said movable portion can slide relative to said guide portion, said bearing surface including a recess for accommodating a lubricant; and wherein said bearing element is able to articulate relative to said guide portion, wherein said bearing surface of said bearing element is flat.

11. A steering assembly for a vehicle comprising:
a fixed guide portion;
a movable steering column portion which is arranged to move relative to said fixed portion to permit a collapse of said steering column assembly; and
at least one bearing element which is located between said fixed guide portion and said movable steering column portion, said bearing element providing a bearing surface upon which said movable portion can slide relative to said guide portion, said bearing surface including a recess for accommodating a lubricant; and wherein said bearing element is able to articulate relative to said guide portion, wherein said fixed portion comprises a U-shaped channel, which accommodates at least partially a section of said moveable portion, an internal wall of said channel providing location for said recess, which accommodates said bearing element.

* * * * *